United States Patent [19]

Takagi et al.

[11] Patent Number: 4,812,969
[45] Date of Patent: Mar. 14, 1989

[54] ADDRESS TRANSLATION UNIT

[75] Inventors: Katsuaki Takagi, Higashimurayama; Hirokazu Aoki, Hachioji; Norio Nakagawa, Kodaira; Yoshimune Hagiwara, Hachioji, all of Japan

[73] Assignee: Hitachi, Ltd., Tokyo, Japan

[21] Appl. No.: 865,840

[22] Filed: May 22, 1986

[30] Foreign Application Priority Data

May 24, 1985 [JP] Japan .................. 60-110373

[51] Int. Cl.⁴ ............... G06F 9/32; G06F 9/36
[52] U.S. Cl. ....................................... 364/200
[58] Field of Search ... 364/200 MS File, 900 MS File

[56] References Cited

U.S. PATENT DOCUMENTS

| | | | |
|---|---|---|---|
| 4,068,303 | 1/1978 | Morita | 364/200 |
| 4,376,297 | 3/1983 | Anderson et al. | 364/200 |
| 4,453,230 | 6/1984 | Mizoguchi et al. | 364/900 |
| 4,456,954 | 6/1984 | Bullions et al. | 364/200 |
| 4,551,797 | 11/1985 | Amdahl et al. | 364/200 |
| 4,612,612 | 9/1986 | Woffinden et al. | 364/200 |
| 4,733,350 | 3/1988 | Tone et al. | 364/200 |

Primary Examiner—Raulfe B. Zache
Assistant Examiner—Ayni Mohamed
Attorney, Agent, or Firm—Antonelli, Terry & Wands

[57] ABSTRACT

An address translation unit for use in a computer system having a multi-virtual space comprises a full associative translation lookaside buffer (TLB) which includes, for each entry, an associative memory array which stores and compares addresses. The associative memory array is provided with a circuit which, when a specific value is set in a common area field, invalidates comparison in a space number field.

7 Claims, 5 Drawing Sheets

F I G. 1
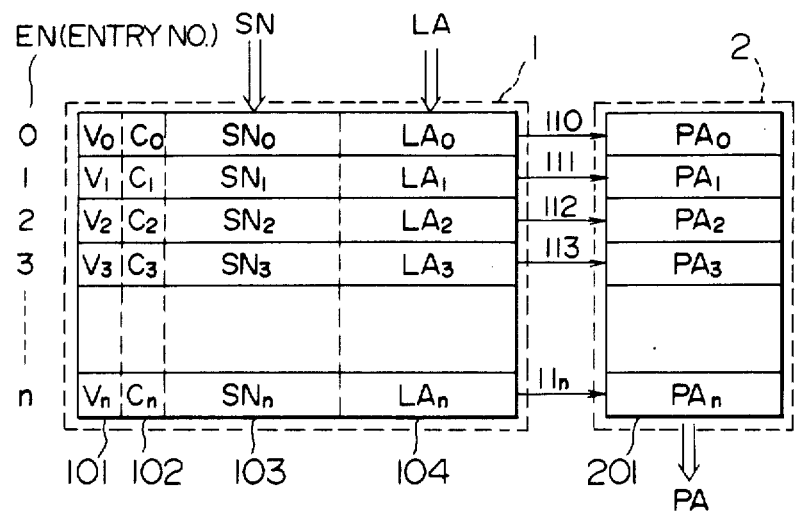
F I G. 2
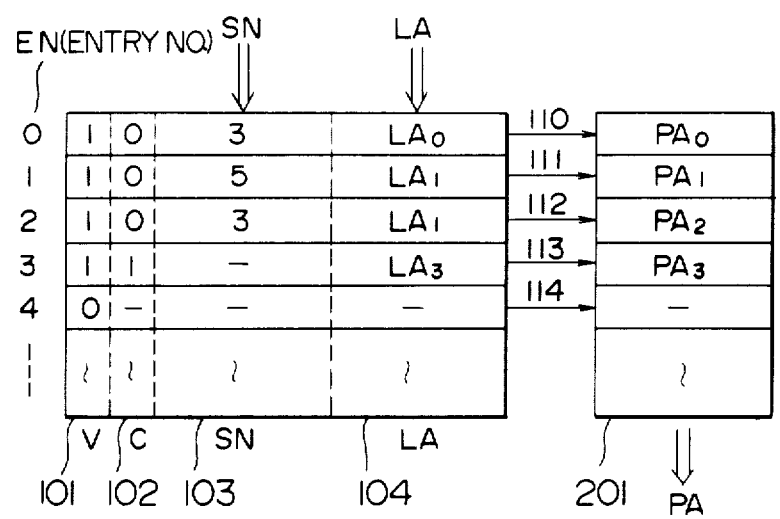

F I G. 4
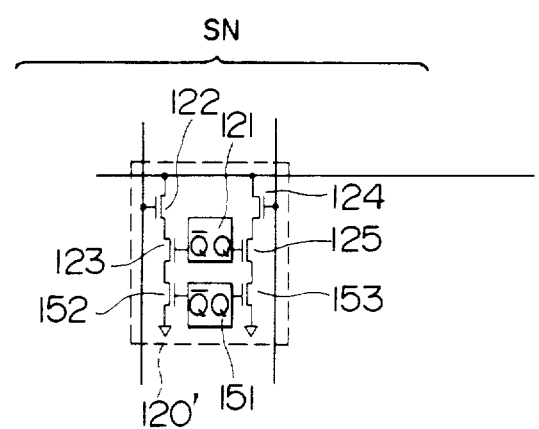

ADDRESS TRANSLATION UNIT

BACKGROUND OF THE INVENTION

This invention relates to an address translation unit suitable for use in a computer system, especially, a microcomputer system having a multi-virtual space.

An address translation unit is a device in which an address dispatched for memory access from a central processing unit (CPU) is used as a logical address, and, on the basis of this logical address, an address actually used for the memory access, that is, a physical address is produced. Such a device is provided in, for example, a memory management unit. There are a variety of kinds of address translation units, and they are most frequently used in large-sized computers and the like. A system using an address translation unit is reported in the Aug. 23, 1976 issue of Nikkei Electronics, No. 141, pp. 72-84, entitled "Technique for Realization of Multiple Storage and Structure of OS." In the reported system, information necessary for address translation is stored in the form of a translation table on a memory, and, on the basis of logical addresses, the address translation unit checks the translation table to produce physical addresses. In a computer system, the possibility of re-use of an address used once is high. Therefore, it is a general structure of an address translation unit that an address translated once is stored in a buffer called a translation lookaside buffer (TLB), and this TLB is checked in the next and succeeding steps of access, so that, when the address is found as a result of checking, it can be directly read out from the TLB. Thus, the time required for checking the table can be saved so that address translation can be attained at a high speed.

Where there is only one translation table, the correspondence between logical addresses and physical addresses is primarily determined. However, common use of a single translation table by multiple users or for a multitask operation leads to such defects that complex management is required for the common use, and the number of stored logical addresses allotted to one task is small. It is therefore a common practice that a plurality of translation tables are prepared, and these tables are allotted to individual users or tasks, respectively. In such a case, a number of physical addresses (as many as the number of the tables) correspond to a single logical address. This is equivalent to the presence of a plurality of logical spaces (virtual spaces), and the group of such virtual spaces is called a multi-virtual space.

In the case of the multi-virtual space, space numbers are required to distinguish one virtual space from another. Such a space number is clearly indicated in a program or automatically produced in the address translation unit from a start address of a table.

The multi-virtual space includes an area where all the logical addresses correspond to the same physical addresses. This area is called a common area. In an operating system or the like, programs or data to be used in common to all the spaces are disposed in this common area.

When no space numbers are stored in the TLB, logical addresses other than those disposed in the common area must be purged from the TLB each time one space is changed over to another. This is because otherwise a new space cannot be distinguished from the previous space. When the logical addresses are so purged from the TLB, a return from the new space to the previous one requires an operation in which all the addresses are translated again on the table, and the translated addresses are set in the TLB. Thus, in the system having the multi-virtual space, the address translation is required each time one space is changed over to another, resulting in an undesirable reduction of the overall performance of the system.

As a means for dealing with such a defect, a method is known in which space numbers are stored in the TLB. For example, such space numbers can be set to correspond to the pointers of translation tables. The known method is effective in that the overall system performance can be improved since a space can be changed over to another without the necessity for purging the contents of the TLB. The TLB referred to above has a construction called a set associative system. According to this set associative system, the TLB is formed of an assembly of a plurality of sets of memories which include part (called an index) of logical addresses. When the number of the sets is, for example two, logical addresses having the same index can only be set in the TLB. Thus, even when the TLB has a vacant and available entry, there may be addresses that cannot be set in the TLB, and this leads to an undesirable reduction of the performance. According to the set associative system, a comparator is provided in each set of the TLB to compare the space number and logical address read out from the TLB with those applied for access. When coincidence is reached therebetween, the physical address read out from the TLB appears as the actual memory address. A flag indicative of the common area is also generated from the TLB. When such a flag indicative of the common area appears, comparison of the space numbers is not done, and it is unconditionally regarded that coincidence is reached between the space numbers. (There is another system according to which a special space number, instead of the common area flag, is indicative of the common area.)

Further, there is a system in which the index employed in the set associative system is not used, and the number of sets is equal to the number of entries. This system is called a full associative system. In this full associative system, a comparator is associated with each of the entries. According to the full associative system, all the addresses applied for access can be set in the TLB. Therefore, when the number of entries is the same, the bit ratio in the full associative system is higher than that in the set associative system, and the system performance is correspondingly improved. However, because of the complexity of the circuit, the full associative system has not been practically employed in a large-sized computer including a TLB composed of discrete parts. On the other hand, the TLB can be relatively easily formed of an LSI of regular structure. However, in view of the fact that one comparator is required for each of the entries, the TLB of complex structure is not practical when the circuit scale and operation speed are taken into account. Further, in the case of the TLB of LSI structure, the number of entries is limited. For the reasons described above, a full associative TLB including space addresses has not been put into practical use.

SUMMARY OF THE INVENTION

It is a primary object of the present invention to provide an address translation unit including a full associative TLB for use in a system having a multi-virtual space, in which the TLB includes, for each entry, a space number field, a common area flag field and a logical address field, and comparison between space numbers is not done when a common area flag is set already in the common area flag field.

The full associative TLB includes, for each entry, an associative memory array which stores and compares addresses. The associative memory array is provided with a circuit which, when a specific value is set in a field, invalidates comparison in another field. That is, in the associative memory array including a space number field and a common area flag field, space numbers are compared and are not compared when a common area flag is not set and is set in the common area flag field, respectively.

BRIEF DESCRIPTION OF THE DRAWINGS

FIG. 1 is a block diagram of a full associative TLB employed in an embodiment of the present invention.

FIG. 2 is a numerical illustration of the operation of the full associative TLB shown in FIG. 1.

FIG. 4 is a circuit diagram of a modification of one of the cells shown in FIG. 3.

DESCRIPTION OF THE PREFERRED EMBODIMENTS

Figure 3:
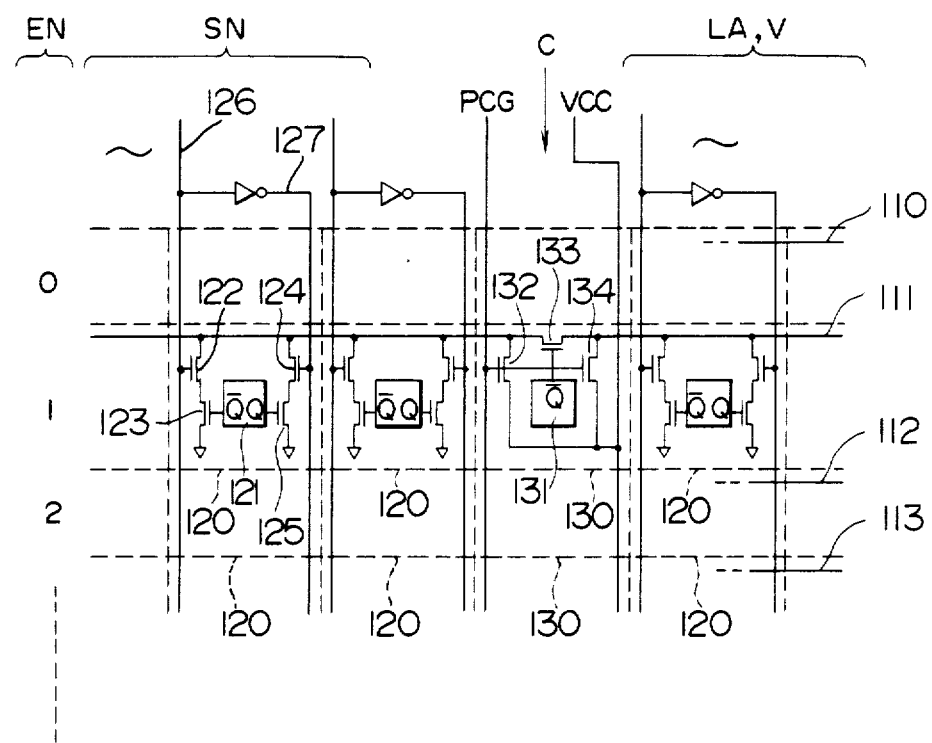
FIG. 3 is a circuit diagram of one form of the associative memory part including MOS transistors.

Preferred embodiments of the address translation unit according to the present invention will be described with reference to the drawings.

FIG. 1 is a block diagram of a full associative TLB employed in an embodiment of the address translation unit according to the present invention. Referring to FIG. 1, the TLB is composed of an associative array part 1 and a data part 2. The associative array part 1 is an array of entries of entry numbers EN(0-n), and each of the entries includes four fields, that is, a valid flag field 101, a common area flag field 102, a space number field 103 and a logical address field 104. Each valid flag field 101 indicates whether the entry to which it belongs is valid or not. Each common area flag field 102 specifies as to whether or not a space number is to be compared in the corresponding space number field 103.

Suppose now that a space number SN and a logical address LA are applied to the associative array part 1. Then, for each of the entries which are valid because their valid flag fields 101 are "1", the space number SN is compared with the value of the space number field 103, and the logical address LA is compared with the value of the logical address field 104. When the common area flag fields 102 are "0", one of the entries is selected where both the space number SN and the logical address LA coincide with those of the space number field and logical address field, and one of coincidence detection signals 110 to 11n corresponding to the selected entry is selected. On the other hand, when the common area flag fields are "1", the result of comparison of the space numbers is ignored, and one of the coincidence detection signals 110 to 11n corresponding to the entry where the logical address LA coincides with that of the logical address field 103 is selected.

The coincidence detection signals 110 to 11n are applied to the data part 2. The data part 2 includes physical address fields 201, and one of physical addresses PA corresponding to the selected one of the coincidence detection signals 110 to 11n is read out.

The operation of the TLB shown in FIG. 1 will be numerically described with reference to FIG. 2. Suppose now that the contents of the entries No. 0 to No. 4 are as illustrated. It will be seen that the valid flag V is "0" in the case of the entry No. 4, and this entry No. 4 is excepted from the object of comparison. The values of the logical address fields 104 are the same in the case of the entries No. 1 and No. 2. However, they are separate spaces, because the common area flags C are "0", and the space number fields 103 have different values "5" and "3". Therefore, the corresponding physical addresses are $PA_1$ and $PA_2$ which are different from each other. In the case of the entry No. 3, the common area flag C is "1". Therefore, regardless of the value of the space number field 103, it is deemed that coincidence is reached in the result of space number comparison.

Suppose that a space number SN = "3" and a logical address LA = $LA_1$ are applied as inputs to the TLB. Then, coincidence occurs in the entry No. 2, and the coincidence detection signal 112 is selected. Consequently, the physical address $PA_2$ appears at the output of the data part 2.

On the other hand, when the space number input SN is SN = "1", and the logical address input LA is LA = $LA_3$, there is no entry where the space number SN coincides with the space number data. However, in the case of the entry No. 3 where the common area flag C is "1", it is deemed that coincidence is attained for all the values of the space number SN. On the other hand, from the aspect of comparison of the logical address LA, coincidence is attained in the entry No. 3 where the logical address is $LA_3$. Thus, the entry No. 3 is selected, and the coincidence detection signal 113 is selected. Consequently, the physical address $PA_3$ appears at the output of the data part 2.

FIG. 3 shows one form of the associative array part 1 including MOS transistors. In FIG. 3 in which parts associated with the entry No. 1 are only shown, the reference numerals 122 to 125 and 133 designate N-channel MOS transistors, and 132 and 134 designate P-channel MOS transistors. The reference numerals 121 and 131 designate data memory cells in which data has been stored. Although data writing and reading means associated with the data memory cells 121 and 131 are not shown in FIG. 3 for the sake of simplicity, such means are provided and are similar to conventional ones. A series of cells 130 provide the column of the common area flags C, and, except for "the common area flags C, a series of associative memory cells 120 constitute the other fields. The MOS transistors 132 and 134 are provided so that the coincidence detection signal line 111 is pre-charged to a state of "1" (Vcc) under control of a pre-charging signal PCG.

When the common area flag C is "0", "1" appears at the output $\bar{Q}$ of the memory cell 131, and the MOS gate 133 is in its on state. Then, when an input signal "1" is applied by way of, for example, an input line 126, an inverted signal "0" appears on another input line 127. As a result, the MOS transistors 122 and 124 are turned on and off respectively. Suppose that the data stored in the memory cell 121 is, for example, "0". Then, the MOS transistors 123 and 125 are turned on and off respectively. As a result, the coincidence detection signal line 111 is grounded through the MOS transistors 122 and 123, resulting in appearance of the ground potential ("0"). Such a case is interpreted as non-coincidence. On the other hand, when the data stored in the memory cell 121 is "1", the MOS transistor 123 is turned off, and the memory cell 120 has no path grounding the coincidence detection signal. Such a case is interpreted that coincidence is attained in the memory cell 120. Similar comparison is made in the other cells belonging to the same row, and "1" appears on the coincidence detection signal line 111 only when coincidence is reached in all of the cells.

Then, when the flag C indicative of the common area is "1", "0" appears at the output $\overline{Q}$ of the memory cell 131. Therefore, the MOS transistor 133 is turned off, and the results of comparison in the cells located on the left-hand side of the cell 131 are ignored. Thus, when the arrangement is such that comparison of the space numbers SN is performed in the cells located on the left-hand side of the cell 131, comparison of the space numbers SN is not performed when the common area flag C is "1". The logical addresses LA and the valid flags V are always compared regardless of the value of the common area flag C when they are disposed on the right-hand side of the common area flag C.

The above description applies to each of the entries. Thus, an associative array of a TLB can be provided in which each entry has a common area flag, and comparison of the space numbers is not performed when the common area flag is "1".

In FIG. 3, the coincidence detection signal lines and cells (LA and V), which are located on the right-hand side of the common area flag cells C, that is, which are not influenced by the common area flag, may be folded back to the left to be located on the left-hand side of the common area flag cells C. Such an arrangement is logically the same as that of FIG. 3.

As an expansion of the common area flag, a plurality of flags invalidating the fields of the associative array may be easily provided.

Figure 5:
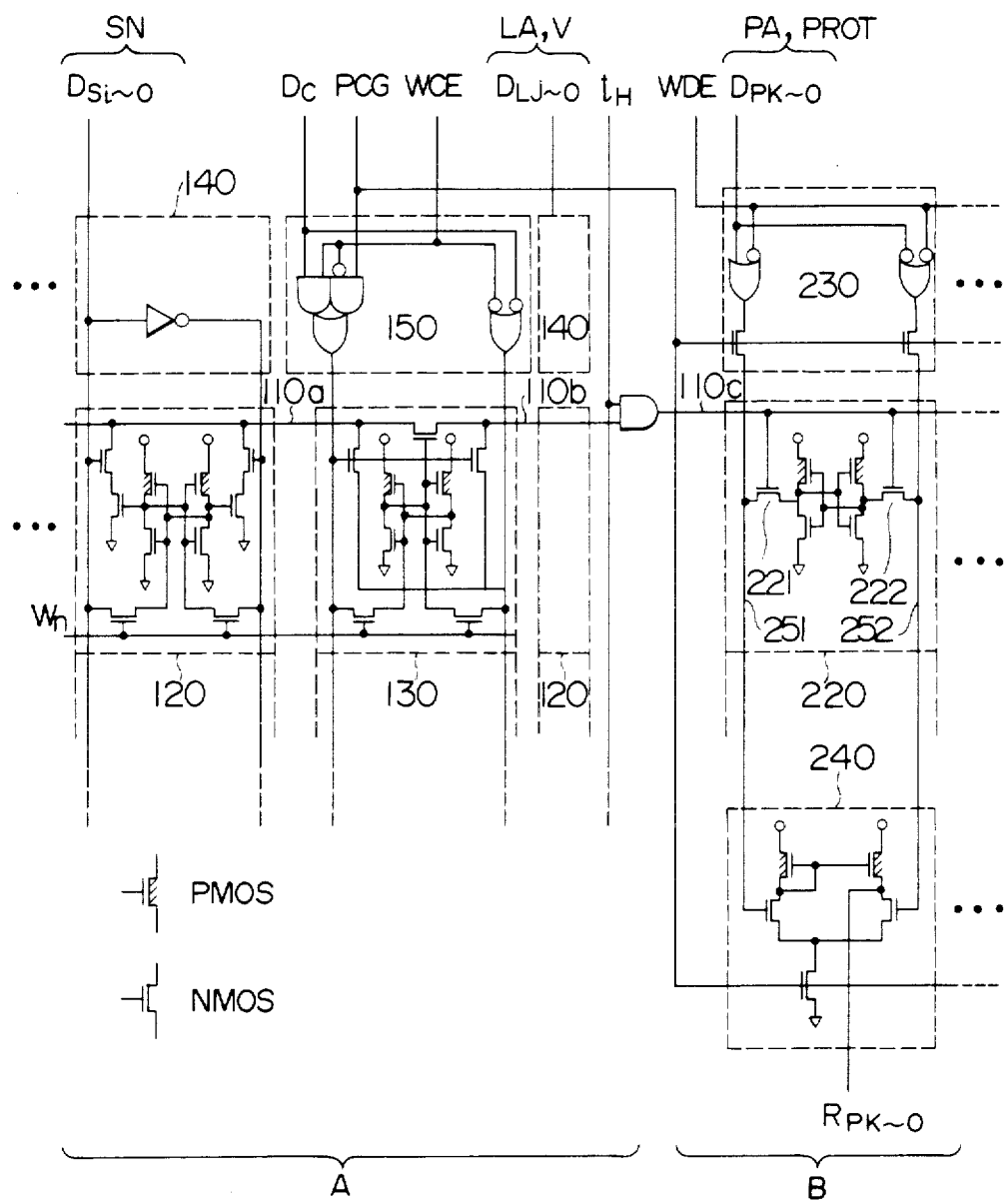
FIG. 5 is a circuit diagram showing another embodiment realized by a TLB circuit composed of CMOS LSI.
Figure 6:
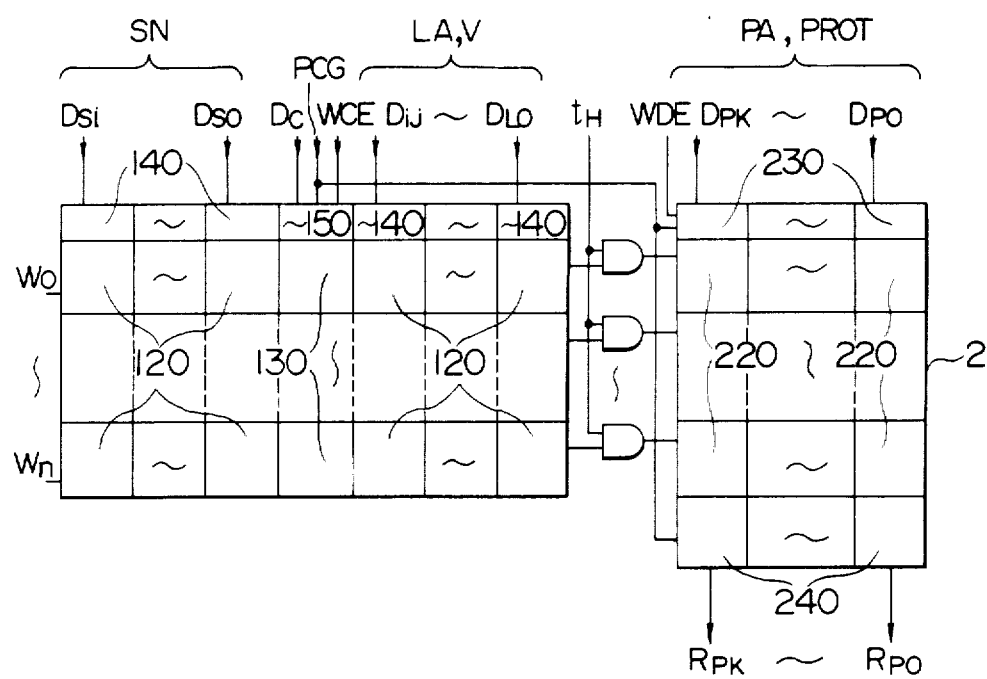
FIG. 6 is a block diagram of the TLB circuit shown in FIG. 5.

FIG. 5 is a circuit diagram showing another embodiment realized by a TLB circuit composed of CMOS LSI, and FIG. 6 is a block diagram of the TLB circuit shown in FIG. 5. In FIG. 5, transistor symbols with hatching indicate PMOS transistors, and the other normal transistor symbols indicate NMOS transistors. The write operation into cells of the associative array part 1 is carried out by setting the line Wn of a desired entry to "1", after the line WCE is set to "1" and the write information is set $D_{Si}$–$D_{SO}$, $D_C$ and $D_{Lj}$–$D_{LO}$. The write on the lines operation into the data part 2 is carried out by firstly having the associative array part associative with a predetermined pattern to set either one of the coincidence detection signal lines to "1", so that the transistors 221 and 222 of the data cell 220 are turned on. Then, the write operation is completed by setting the line WDE to "1" and setting the write data on the lines $D_{Pk}$–$D_{PO}$.

In the address translation, let us assume that necessary information has already been set in the associative array part 1 and the data part 2 before the address translation. It is also noted that each of the lines WCE, WDE, $W_O$–$W_n$ is fixed to "0". Before initiating the address translation, the line PCG is set to "1" and the coincidence detection lines 110a, 110b and the data lines 251, 252 are precharged. At this time, the line $t_H$ is set to "0" to control the word line 110c of the data part 2 to become "0". Thereafter, when PCG is set to "0", with the retrieval information being set on the lines $D_{Si}$–$D_{SO}$ and $D_{Lj}$–$D_{LO}$, the information is compared with the data stored in each address cell 120. As the result of the comparison in all the cells, only the coincidence detection line 110b of the entry that brings about coincidence is set to "1". At this time, if the common flag cell 130 in an entry stores "0", the comparison with all the data of SN, LA and V is carried out. However, if the common flag cell in an entry stores "1", the comparison with the data of only LA and V is carried out, and the coincidence detection line 110a which indicates the comparison result with the data of SN is isolated so as to be omitted from the object of the comparison. Thus, when the timing signal $t_H$ is set to "1" at the time the level of the coincidence detection line 110b has been established, the result of the coincidence detection is delivered to the word line 110c, and the content of the data cell 220 to the coincident entry is outputted on the data lines 251 and 252. The data on the data lines 251 and 252 are then inputted to the sense amplifier 240, and the amplified data are outputted on the read-out information lines $R_{Pk}$–$R_{PO}$. In this way, the logical address LA can be translated into the physical address PA on the lines $R_{Pk}$–$R_{PO}$.

FIG. 4 is a circuit diagram of a modified cell provided with a mask flag masking each bit of a space number, as an example of the expansion of the common area flag. Referring to FIG. 4, the cell 120' includes N-channel MOS transistors 152, 153 and a mask flag cell 151 added to the cell 120 shown in FIG. 3. Comparison by the cell 120' is valid and invalid when the data in the mask flag cell 151 is "1" and "0" respectively. Employment of such a cell structure including a mask flag cell can invalidate any desired field and widens the applicable range of the TLB.

It will be understood from the foregoing detailed description of the present invention that a space number can be judged valid or invalid on the basis of a common area flag in a full associative TLB. Therefore, the number of purging and re-setting logical addresses in a multi-virtual space can be decreased thereby improving the system performance.

We claim:

1. An address translation unit including an associative translation look aside buffer (TLB) comprising:
   (A) an associative array portion including a plurality of entries, each of which includes
      (a) a common area flag field for storing flag information indicating whether a predetermined logical address corresponds to a common area in a multi-virtual space, wherein either one of the programs and data commonly used by devices accessing said multi-virtual space are disposed in said common area,
      (b) a space number field for storing a logical address value,
      (c) a logical address field for storing a logical address value,
      (d) a coincidence detection line disposed along said space number field and said logical address field,
      (e) means for comparing an input space number with a first value stored in said space number field, for comparing an input logical address with a second value stored in said logical address field, for generating a coincidence output on said coincidence detection line when said input space number and said input logical address coincide with said first and said second values, respectively, and for generating said coincidence output on said coincidence detection line when said flag information stored in said common area flag field indicates that said logical address value stored in said logical address field corresponds to said common area in said multi-virtual space and when said input logical address coincides with said second value stored in said logical address field, regardless of said first value stored in said space number field; and (B) a data portion including (a) means for selecting one of a plurality of physical addresses in response to outputs on said coincidence detection line of said associative array portion.

2. An address translation unit as claimed in claim 1, wherein each of said plurality of entries of said associative array portion further includes;

a switching element disposed midway of said coincidence detection line to be turned on and off depending on a value of a memory cell storing said flag information of said common area flag field;

wherein said space number field includes an array of first memory cells connected to said coincidence detection line on a first side of said switching element, for storing said space number value, and wherein said logical address field includes an array of second memory cells connected to said coincidence detection line on a second side of said switching element, for storing said logical value, wherein said switching element is turned off depending on said value of said memory cell storing said flag information so as to ignore said first value stored in said array of first memory cells.

3. An address translation unit as claimed in claim 1, wherein said space number field of said associative array portion further includes a mask flag cell for storing data, so that said value of said space number field can be masked by a mask pattern depending on the data stored in said mask flag cell.

4. An address translation unit as claimed in claim 2, wherein said TLB further includes a valid flag field for storing a valid flag indicating validity or invalidity of a translation from a logical address into a physical address.

5. An address translation unit as claimed in claim 3, wherein said TLB further includes a valid flag field for storing a valid flag indicating validity or invalidity of a translation from a logical address into a physical address.

6. An address translation unit including an associative look aside buffer (TLB) comprising:

(A) an associative array portion including (a) a common flag field for storing flag information indicating whether a predetermined logical address corresponds to a common area in a multi-virtual space, (b) a space number field for storing a space number value, (c) a logical address field for storing a logical address value, (d) a coincidence detection line disposed along said space number field and said logical address field, (e) means for comparing an input space number with a first value stored in said space number field, for comparing an input logical address with a second value stored in said logical address field, for generating a coincidence output on said coincidence detection line when said input space number and said input logical address coincidence with said first and said second values, respectively, and for generating said coincidence output on said coincidence detection line when said flag information stored said common area flag field indicates that said logical address value stored in said logical address field corresponds to said common area in said multi-virtual space, regardless of said first value stored in said space number field; and (B) a data portion including (a) means for selecting one of a plurality of physical addresses in response to outputs on said coincidence detection line of said associative array portion, wherein said associative array portion further includes a switching element disposed midway of said coincidence detection line to be turned on and off depending on a value of a memory cell storing said flag information of said common area flag field;

wherein said space number field includes an array of first memory cells connected to said coincidence detection line on a first side of said switching element, for storing said space number values, wherein said logical address field includes an array of second memory cells connected to said coincidence detection line on a second side of said switching element, for storing said logical address value, and wherein said switching element is turned off depending on said value of said memory cell storing said flag information so as to provide said coincidence output.

7. An address translation unit as claimed in claim 6, wherein said space number field of said associative array portion further includes a mask flag cell for storing data, so that said value of said space number field can be masked by a mask pattern depending on the data stored in said mask field cell when generating said coincidence output.

* * * * *